Sept. 1, 1953     C. C. CROCKETT     2,650,488
IGNITER AND METHOD OF MAKING SAME
Filed Jan. 17, 1948     5 Sheets-Sheet 1
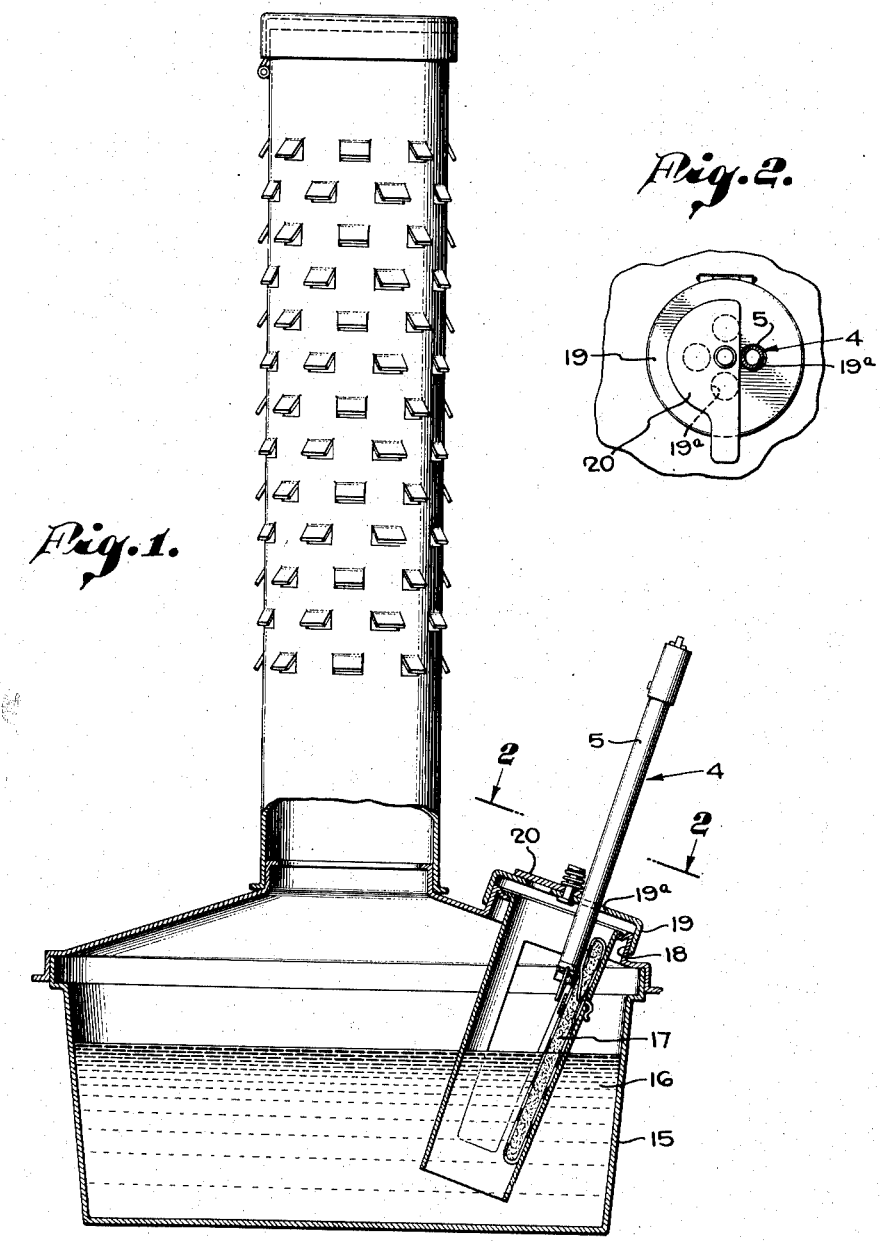
INVENTOR.
Cyril Charles Crockett
BY Paul A. Weilein
ATTORNEY Sept. 1, 1953
C. C. CROCKETT
2,650,488
IGNITER AND METHOD OF MAKING SAME
Filed Jan. 17, 1948
5 Sheets-Sheet 2
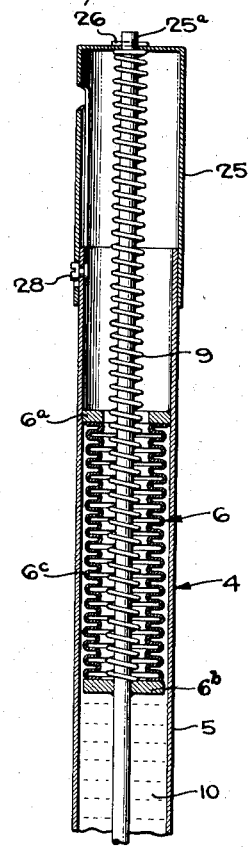
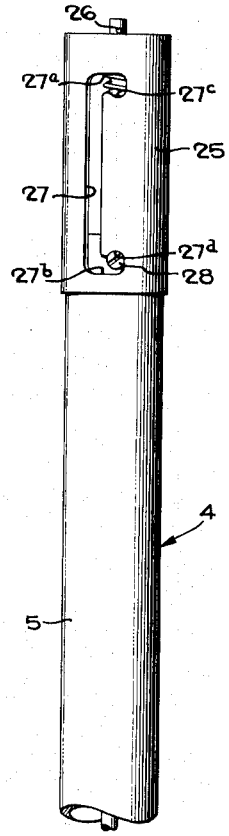
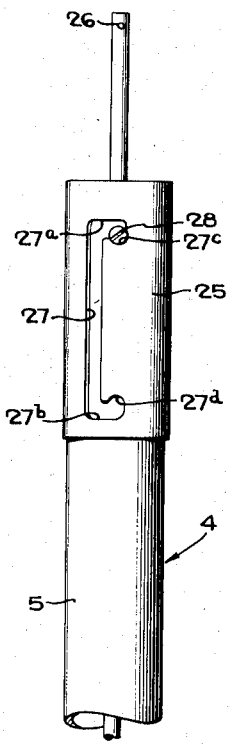
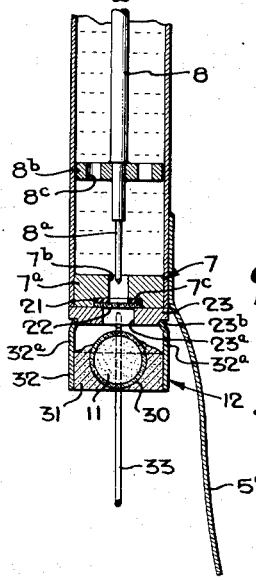
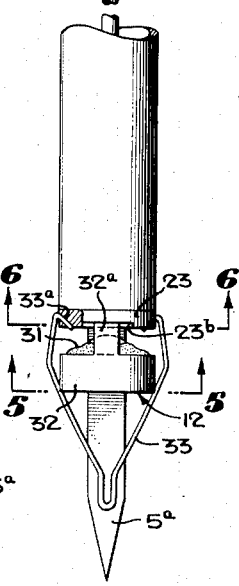
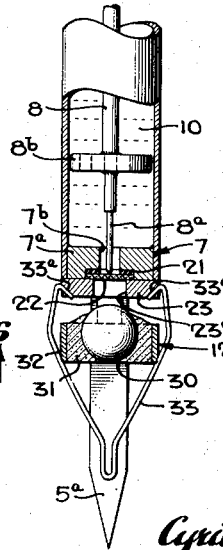
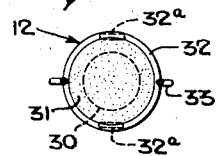
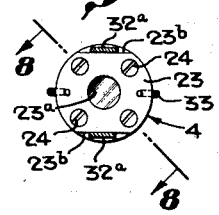
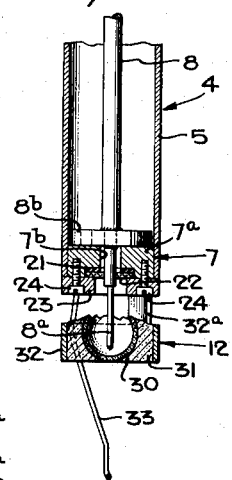
INVENTOR.
Cyril Charles Crockett
BY
Paul A. Weilein
ATTORNEY

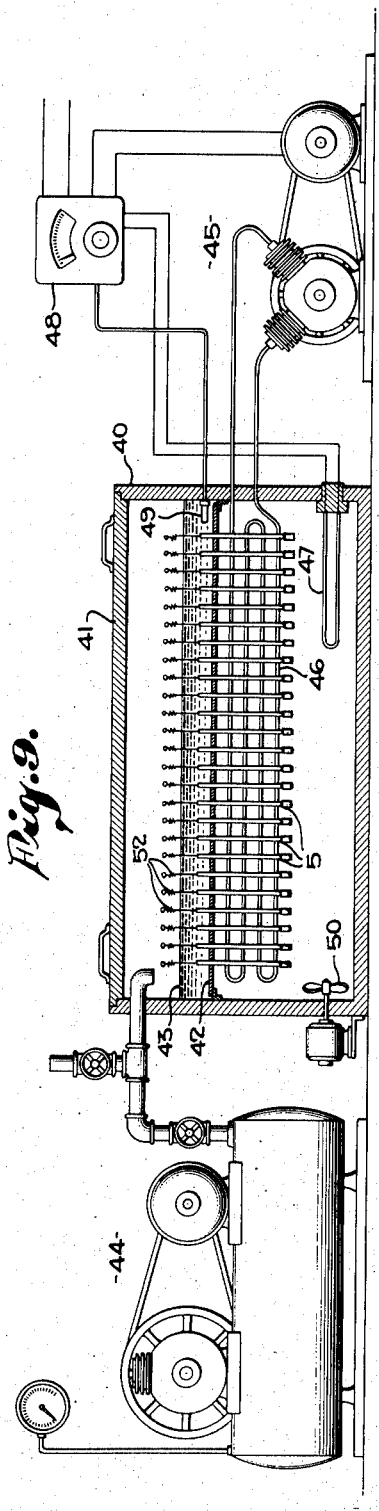
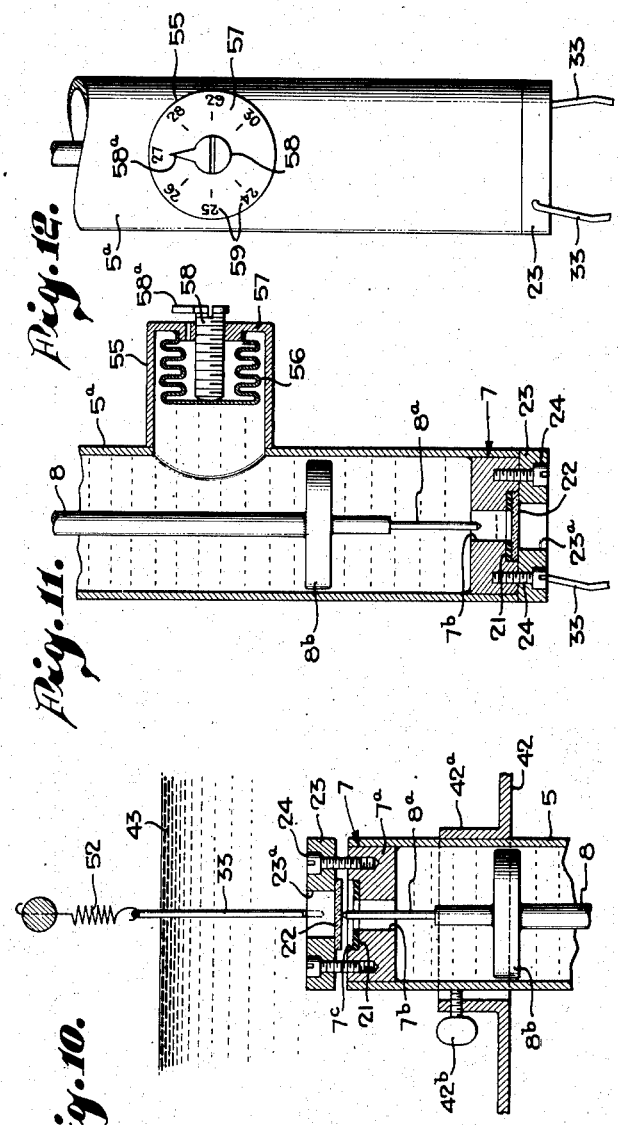

Sept. 1, 1953  C. C. CROCKETT  2,650,488
IGNITER AND METHOD OF MAKING SAME
Filed Jan. 17, 1948  5 Sheets-Sheet 4
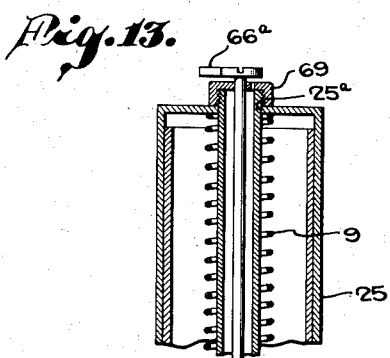
Fig. 13.
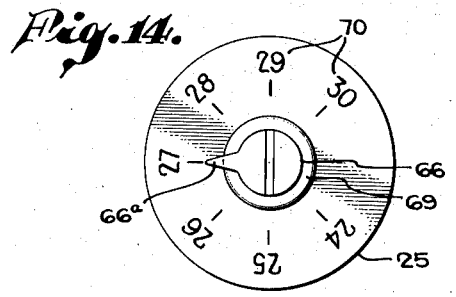
Fig. 14.
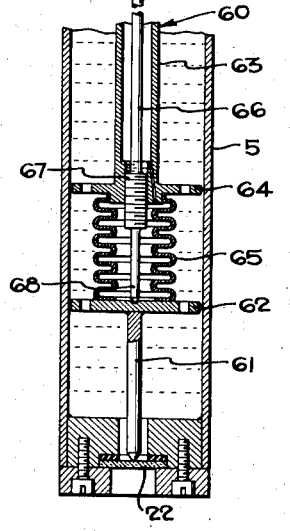
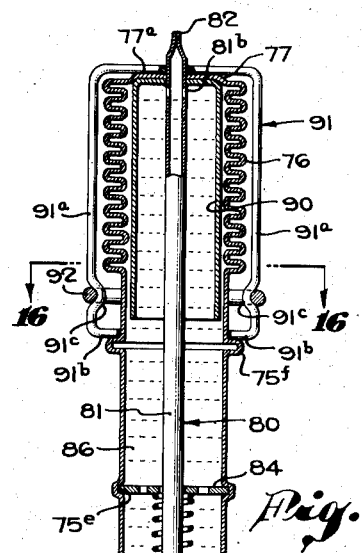
Fig. 15.
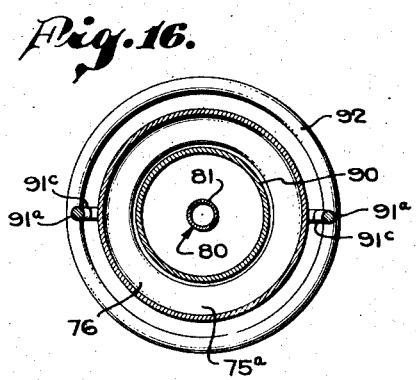
Fig. 16.
INVENTOR.
Cyril Charles Crockett
BY Paul A. Weilein
ATTORNEY

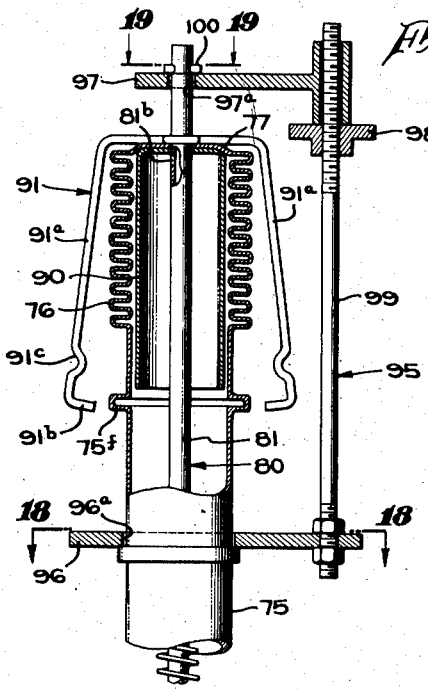

Patented Sept. 1, 1953

2,650,488

UNITED STATES PATENT OFFICE 2,650,488

IGNITER AND METHOD OF MAKING SAME

Cyril Charles Crockett, Glendale, Calif.

Application January 17, 1948, Serial No. 2,888

18 Claims. (Cl. 67—3)

This invention relates to a device for discharging liquid automatically in response to a predetermined ambient temperature, and to a method of making the same. More particularly, it relates to such a device wherein the liquid is discharged upon the temperature of the ambient air reaching a predetermined low and so arranged that the liquid is ignited when released.

It is an object of this invention to provide a device of this character which is inexpensive, simple and reliable, and which will operate within close limits of a predetermined temperature.

It is another object of this invention to provide such a device wherein previously stored energy is released in response to a critical temperature, for operating the device.

It is another object of this invention to provide such a device which optionally may be rendered inoperative in a simple manner to prevent injury of the parts, as well as to avoid accidental operation, and which may be conditioned for operation thereafter whenever desired, in response to a critical temperature.

It is another object of this invention to provide such a device arranged to operate in response to a critical temperature, which is normally inoperative, and which may be optionally set for operation, the setting of the device serving to store energy which is released at said critical temperature to operate the device.

It is another object of this invention to provide such a device which is adjustable to operate at any desired critical temperature within a predetermined range.

It is another object of this invention to provide such a device wherein the critical temperature at which the device operates is determined in a novel manner.

It is another object of this invention to provide such a device wherein the released liquid has an accurately predetermined volume.

It is another object of this invention to provide a novel method of making such a device.

It is another object of this invention to provide a novel method of predetermining the critical operating temperature of such a device.

It is another object of this invention to provide such a device optionally adjustable to operate at a critical temperature within a predetermined range, wherein the range is fixed in a novel manner.

It is another object of this invention to provide such a device wherein the liquid is ignited upon release.

It is another object of this invention to provide a device for automatically lighting a heater, such as an orchard heater, smudge pot or the like, in response to a critical, low temperature.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense since the scope of the invention is best defined by the appended claims.

By way of example, the device is shown and described as incorporated in an igniter adapted to supply a flame for lighting a smudge pot, orchard heater or the like, when a critical low temperature is reached, including for this purpose means for igniting the discharged liquid. However, it is to be understood that the device is not limited to such use, but may be employed for any purpose requiring discharge of an accurately predetermined volume of liquid in response to a change in temperature to a critical point.

In the drawings:

Figure 1 is a vertical section, partly in elevation, of a conventional orchard heater, showing an igniter incorporating features of the invention, installed for use;

Figure 2 is a fragmentary cross section, taken substantially as indicated by line 2—2 of Figure 1;

Figure 3 is an axial section, on an enlarged scale, of the igniter of Figure 1, partly broken away to reduce the size of the figure;

Figure 4 is an elevation as seen from the left of Figure 3;

Figures 5 and 6 are cross sections, taken substantially as indicated by the correspondingly numbered lines on Figure 4;

Figure 7 is a view similar to Figure 4, but partly in section and showing a different adjusted position of the parts;

Figure 8 is a fragmentary section, taken substantially as indicated by line 8—8 of Figure 6, showing another operating position of the parts;

Figure 9 is a schematic view, illustrating apparatus useful in performing a step in the manufacture of the igniter;

Figure 10 is a fragmentary section showing a detail of the apparatus of Figure 9;

Figure 11 is a fragmentary axial section showing a modified form of the igniter of Figure 3;

Figure 12 is an elevation, as seen from the right of Figure 11;

Figure 13 is an axial section of another modified form of igniter, the intermediate portion of the igniter being shown as broken away to reduce the size of the figure;

Figure 14 is a plan view, seen as looking down on Figure 13;

Figure 15 is an axial section of still another modified form of igniter;

Figure 16 is a cross section, taken as indicated by lines 16—16 of Figure 15;

Figure 17 is a fragmentary section, illustrating schematically a step in making the igniter of Figure 15;

Figure 18 is a cross section, taken substantially as indicated by line 18—18 of Figure 17;

Figure 19 is a cross section on an enlarged scale, taken substantially as indicated by line 19—19 of Figure 17;

Figure 20 is an axial section of still another modified form of igniter; and

Figure 21 is a vertical sectional view showing the igniter of Figure 20 installed for use.

Broadly, such an igniter, generally indicated by 4, comprises a tubular shell, such as indicated by the numeral 5 in Figure 3, with an expansible closure 6 at one end, and a closure 7 at the opposite end adapted to form a discharge opening upon appropriate downward movement of a member 8, extending axially of the shell 5 and mounted on the closure 6. A compression spring 9 urges the member 8 downwardly, a liquid filling 10 serving to restrain such movement, said liquid being one in which the volume varies consistently with change in temperature, at least within the range of operation of the device.

The liquid filling 10 forms one body of material, a second body of material 11 being provided closely adjacent, in a cartridge 12. The arrangement is such, that the liquid 10 prevents movement of the member 8 to form an opening through the closure 7 until the ambient temperature reaches a predetermined low. At this point, the member 8 operates in response to spring 9, to release the liquid 10 and to cause it to contact the material 11, these materials being so chosen that a flame is produced by their contact. Optionally operable means are provided for preventing movement of the member 8 to release the liquid, and prevent accidental operation of the device.

As an example of appropriate materials, the liquid 10 may be isopropyl alcohol and the material 11 may be a compound of about 55 parts of chromic anhydride, 20 parts iodine crystals, and 5 parts potassium nitrate. An automatic igniter employing such materials, arranged to be brought into contact in response to a predetermined low temperature for lighting a smudge pot or the like is disclosed and claimed in applications, Serial No. 719,097 now Patent No. 2,480,397, granted August 30, 1949, and Serial No. 729,784, now Patent No. 2,601,098, granted June 17, 1952, filed respectively on December 28, 1946, and February 20, 1947, in the name of Sydney R. Crockett and assigned to the present inventor.

An alternative mixture whach has been found satisfactory for the material 11 is a compound including about 80 parts chromium trioxide, 15 parts iodine crystals, and 5 parts potassium nitrate.

A conventional type of orchard heater, shown in Figure 1, comprises a shallow reservoir or body 15, containing liquid fuel 16 such as crude petroleum, arranged to be ignited by means of a wick 17, supported with its upper end adjacent the filler opening 18. This opening is closed by a removable cap 19, which is provided with a plurality of vent openings 19-a controlled by a rotatable member 20. (See also Figure 2.)

The arrangement is such that the igniter 4 is readily insertible through one of the openings 19-a, a pointed finger or prong 5-a on the shell being adapted to engage the wick 17 and support the igniter in the opening. Release of the materials producing flame in response to a critical temperature, as previously explained, will ignite the wick 17 and the fuel 16. Thus, when the temperature in the orchard or grove reaches a predetermined dangerous low, the lighting of the heaters, smudge pots, or similar protective devices, occurs automatically and without attention on the part of the grower or an attendant. Since each heater is lighted in accordance with the ambient temperature, only those heaters are lighted where the temperature is dangerously low. On the other hand, the required heaters are lighted at once and without delay, such as would be occasioned by an attendant being required to light a large number of heaters.

Referring to that form of igniter shown in Figures 3 to 8, the shell 5 may be of any suitable material, such for example as drawn metal tubing having a coefficient of expansion substantially less than that of liquid 10. The expansible closure 6 comprises an annular member 6-a, appropriately secured about its periphery in a fluid tight manner in the shell 5 near its upper end. A second annular member 6-b, of less diameter than the interior of the tube 5, so as to be freely movable therein, is secured in a fluid tight manner on the operating member 8, shown as comprising a rod. The annular members 6-a and 6-b are joined in a fluid tight manner by a bellows or Sylphon 6-c, which is preferably of some unelastic material, as will appear hereinafter.

The lower end portion 8-a of the bar 8 is of reduced diameter, terminating in a point. A circular member 8-b, freely slideable in the tube 5, is secured on the bar 8 near its lower end, for maintaining the bar substantially coaxial of the tube 5. This member 8-b has several through openings 8-c to permit free passage of the liquid 10 between the space above and below the member 8-b.

The closure 7 comprises a thick disc or plug 7-a secured in the lower end of the shell, having a through aperture 7-b with a counter bore 7-c, which accommodates a gasket 21, and a member 22 adapted to be easily ruptured by the end of the bar 8. For example, the member 22 may be a thin plate of glass or plastic. A retaining ring 23, having a central aperture 23-a, is secured to the plug 7-a by a plurality of screws 24, securing the plate 22 in place against the gasket 21, and in fluid tight relation with the plug 7-a.

The spring 9 is confined between the movable closure member 6 and an elongated cap 25 telescopically mounted on the upper end of the shell 5. The member 8 extends slidably through an opening 25-a in the top of the cap 25, a pin 26 through the bar 8 serving, by engagement with the top of the cap, to limit upward movement of the cap with respect to the bar.

The wall of cap 25 is provided with a longitudinally extending slot 27 having laterally directed portions 27-a and 27-b respectively at its upper and lower ends, which portions have offsets 27-c and 27-d for receiving a pin 28 fixed in the wall of the shell 5. The arrangement is such that the cap 25 in its upper position maintains the member 8 with its lower extremity spaced a short distance above the frangible plate 22 (Figures 3 and 4) independently of the liquid 10, thus preventing operation of the igniter. The cap 25 in its lower position releases the member 8 and compresses the spring 9, the member 8 being supported by the liquid filling 10. The igniter 4 is thus set for operation.

The manner of adjusting the cap 25 to set the igniter for operation comprises imparting a slight upward and rotational movement to the cap, to disengage the pin 28 from the offset 27-d (Figure 4) and position the pin in the axially extending slot 27. The cap 25 is then forced downwardly until the pin 28 engages the upper end of the slot 27, the cap then being turned clockwise and allowed to move upwardly to cause the pin 28 to engage the offset 27-c (Figure 7). Should it be required to render the igniter inoperative after it has been set, a reverse of the foregoing adjustment of the cap 25 is followed. The igniter may be set to be operative or inoperative as often as necessary; when in the inoperative condition, accidental operation to release the liquid 10 as by a blow, or by jarring is guarded against.

The cartridge 12 comprises a glass ampule 30 enclosing the material 11 and mounted as by means of a cementitious material 31 in a ring 32. The ring 32 has a pair of oppositely disposed, upwardly extending legs 32-a, which are urged resiliently to engage notches 23-b on the retaining ring 23, by means of a spring mounting clip 33, secured to the retainer 23 as by hooks 33-a at its upper ends engaging suitable apertures in the retainer 23. The cartridge ring 32 when in place, urges the opposite ends of the clip 33 apart, so that the cartridge is detachably secured in place thereby (see Figures 3 and 7).

In operation, after the cap 25 has been set to release the member 8 and energize the spring 9, the liquid filling 10 supports the member 8, the quantity of liquid being accurately determined to support the member 8 with its lower end 8-a lightly contacting the plate 22 at a predetermined critical temperature (Figure 7) and with the end 8-a spaced above the plate 22 at higher temperature. When the temperature drops below the predetermined temperature the liquid 10 contracts, allowing the member 8 to move downward in response to the force of spring 9 and fracture the plate 22, releasing the liquid filling which permits the member 8 to move to the lower limit of its stroke, breaking the ampule 30 (see Figure 8). This allows the liquid 10 to contact the material 11, and as previously, these materials are of such character as to produce flame upon contact. More particularly, the liquid 10 is inflammable, and since it flows from the shell 5 through a restricted opening, the flame will persist for some time.

This form of igniter is not limited to a single operation, since it may be refilled readily after use with an appropriate quantity of the liquid 10, and a new cartridge 12 may be attached.

Since the temperature at which the igniter operates depends on the volume of liquid filling 10 in the shell 5, the amount of such liquid must be determined quite accurately. One method for accurately filling a number of shells 5 may be carried out, for example, by the aid of apparatus shown schematically in Figures 9 and 10.

Thus, in Figure 9, an insulated tank is indicated by the numeral 40, and has an air tight, removable cover 41. Within tank 40 is a loading rack 42, adapted to support a plurality of shells 5. For this purpose, the rack 42 may have a plurality of openings each surrounded by a collar or hub 42-a, through which a shell 5 is freely insertible, suitable means, as a thumb screw 42-b, being provided for adjustably securing the shell 5 in the rack.

The tank 40 has a body 43 of the liquid with which the shells 5 are to be filled, of such depth that the shells 5 when mounted in the rack 42, are submerged. The tank 40 is arranged to be evacuated by conventional apparatus 44 and is provided with means for accurately controlling the temperature of the liquid 43. A conventional refrigerating unit 45, of suitable capacity and having cooling coils 46 in the liquid 43, serves to lower the temperature of the liquid, while an immersion heater, shown diagrammatically at 47, serves to raise the liquid temperature if necessary. An automatic temperature controller 48 controls the operation of the refrigerating unit 45 and the immersion heater 47 in accordance with the temperature of the liquid 43 as determined by a feeler bulb 49. A motor driven agitator 50 may be provided for insuring a uniform temperature throughout the body of liquid 43.

Each shell 5, prior to filling, is provided with the expansible closure 6, carrying the member 8 and the plug 7-a together with the gasket 21 and frangible closure 22. The retainer 23 with the cartridge clip 33 in place, is then attached by the screws 24, the screws being adjusted to permit a clearance between plate 23 and plug 7-a substantially greater than the thickness of the closure 22. The spring 9 and cap 25 are also in assembled relation at this time, the cap 25 being positioned with pin 28 intermediate the ends of the slot 27 so that the member 8 is not restrained nor appreciably loaded by the spring 9.

The member 8 is then adjusted to engage the closure 22 and push it and the retainer 23 outwardly as far as the screws 24 will allow. Since, as previously indicated, the bellows 6-c are collapsible only under pressure, and no pressure sufficient to compress the bellows is applied thereto at this time, the member 8 will remain in this extended position until forced into the shell 5.

The shell 5 is then mounted in the rack 42 with the open end upward and submerged in the liquid 43, the ring 23, in addition to being supported in spaced relation with the end of the shell 5 by the member 8, being supported by means of a resilient hanger 52 engaging the clip 33.

With the shells 5 arranged in this manner, the tank 40 is evacuated and the temperature of the liquid 43 reduced to approximately that at which the igniters are to operate, it being noted that tests have established that the igniters hereof will operate when the temperature of the liquid reaches a point but slightly at variance with the filling temperature, for example at a variance of but a small fraction of one degree. Air in the shells will escape through the openings provided by the spaced plate 22 and be replaced by the liquid 43. Since it is important that the evacuation be as complete as possible, the shells may be allowed to remain in the tank 40 for some time. Optionally, there may be a preliminary evacuation of the liquid alone, or after placing the shells 5 in the tank 40 with the liquid at a reduced depth.

After a suitable interval, the vacuum is broken and the tank cover 41 is removed. The screws 24 are then tightened to cause the ring 23 to seal the opening 7-b, preferably while maintaining the shell submerged. This forces the member 8 back into the shell, compressing the bellows 6-c slightly. At this time the member 8 is not spring loaded due to the unlocked position of the cap 25. Moreover, the force required for the slight compressing of the bellows 6-c is less than the force which would rupture the frangible closure 22 bearing against the end of the member 8. Thus, the sealing action may be effected without rupturing the closure 22 and no rupturing force will be applied thereto until the member 8 is fully spring loaded and the temperature of the liquid reaches the point for firing the device. In this way the member 8 is accurately positioned against the closure 22 and the shell 5 is completely filled with the liquid 10 at the predetermined temperature.

It may be desirable to have the igniter operate at some temperature other than that provided when the shell 5 was filled. This may be accomplished by providing means for varying the volume of the shell 5. Thus, for example, if the shell was filled at a temperature of 27°, a drop in temperature below 27° would cause the igniter to operate. However, if after filling, the volume of the shell 5 was slightly increased, the critical or operating temperature would be increased, that is the igniter, for example, would operate at a temperature above 27°. On the other hand, if the volume of the shell 5 was decreased after filling, the critical temperature would be decreased, and the device would not operate for example, until the temperature dropped below 26°.

Figures 11 and 12 show one type of means which may be provided for adjusting the critical temperature of an igniter such as shown in Figures 3 to 8, and it is to be understood that the structure and mode of operation of this igniter is substantially identical with the previously disclosed form except for the adjusting means. Thus, the shell, indicated by 5-a, has a lateral extension 55 with an elastic bellows or Sylphon 56 secured in a fluid tight manner to the end wall 57 thereof. An adjusting member 58 is threaded through the end wall 57, engaging the inner end of the Sylphon 56. By turning the member 58 in one direction, the bellows is expanded, reducing the volume of the shell 5-a. By turning the member 58 in the opposite direction, the bellows 56 is allowed to contract due to its elasticity, increasing the volume of the shell. The member 58 may be provided with a pointer 58-a, cooperating with indicia 59 on the wall 57, to indicate the critical temperature at which the igniter is set in accordance with the adjustment of the member 58.

The critical temperature may also be varied by adjusting the length of the operating member 8, in that form of the invention shown in Figure 3, between the frangible closure 22 and the expansible closure 6. Thus, if the member 8 is shortened after the liquid filling has been supplied at a predetermined temperature, the device will require a greater drop below the predetermined temperature for operation, corresponding to a lower critical temperature; if the member 8 is lengthened the device will operate at a temperature above the predetermined temperature, thus raising the critical temperature to which the device responds.

In Figure 13, an igniter is shown which is substantially identical with that of the form of Figure 3, except for a modified form of operating member 60. This member comprises a lower portion 61 adapted to engage the closure 22 and guided in the shell 5 by a head 62 at its upper end, and a tubular upper portion 63 guided in the shell 5 by a head 64 at its lower end, and slidably passing through the aperture 25-a in the cap 25. It is to be understood that this tubular portion 63 is joined to the member 6-b of the expansible closure 6 so as to move therewith to cause the lower portion 61 to rupture the closure 22, in a similar manner to that in which member 8 of the form of Figure 3 operates.

The upper and lower portions 63 and 61 are joined by an elastic bellows or Sylphon 65, the opposite ends of which are secured in a fluid tight manner respectively to the heads 64 and 62. The bellows 65 urges the member portions 63 and 61 toward each other, such movement being limited by an adjusting member 66 having a portion 67 threadedly engaging the upper portiton 63, and a lower extremity 68 contacting the lower portion 61. The member 66 extends upwardly and through a cap nut 69 threaded on the outer end of the tubular portion 63 and serving as a bearing for the member 66. This nut also serves to limit outward movement of the cap 25 with respect to the member 63, at the same time permitting inward movement of the cap 25, to set the igniter and energize spring 9.

By rotating the member 66, the effective length of the member 60 is altered. The member 66 may have a pointer 66-a, cooperating with appropriate indicia 70 on the upper end of cap 25 (Figure 14), to indicate the critical temperature to which the igniter is set.

A modified form of igniter is shown in Figures 15 and 16, wherein the tubular shell 75 comprises an appropriately formed sheet, of non-resilient material, rolled and joined in a fluid tight manner along a longitudinal seam 75-a. The upper end portion of the shell 75 is corrugated to form a bellows 76 mounting the upper end closure 77 for movement toward and away from the frangible closure 78 at the lower end.

The upper closure 77 comprises a circular plate with a raised central portion 77-a, joined in a fluid tight manner to the upper end of the bellows 76. The lower end of the shell 75 has an inwardly directed flange 75-b and a reduced circular extension 75-c forming an annular recess for mounting the closure 78, which may be a thin plate of glass or suitable plsatic. A gasket 79 is interposed between the closure 78 and the flange 75-b, the circular extension being spun over as at 75-d to secure the plate 78 in fluid tight relation with the flange 75-b.

The operating member 80 comprises a tube 81, extending axially of the shell 75, having means at its lower end forming a reduced pointed portion 81-a adapted to rupture the closure 78, and extending through the upper closure 77, being secured thereto in a fluid tight manner. The tube 81 provides an opening for filling and evacuating the shell 75, for this purpose being provided with one or more openings 81-b into the interior of the shell, and being sealed after the filling operation, as at 82.

A compression spring 83 is provided for urging the operating member 80 toward the frangible closure 78. This spring 83 is compressed between an apertured disc 84 through which the member 80 is freely slidable, and a guide disc 85 secured on the tube 80 and freely movable in the shell 75. The disc 84 is secured against axial movement in the shell 75 as by being mounted in an annular recess 75-e formed in the shell.

As in the first described form of the invention, the operating member 80 is urged to rupture the closure 78 by the compression spring 83, and is restrained until a predetermined low temperature is reached by a liquid filling 86. When this temperature is reached, the contraction of the liquid is such as to allow the member 80 to rupture the closure 78 and release the liquid. As before, a cartridge 87, containing a glass ampule 88, is secured to the shell 75 adjacent the lower end thereof as by a spring clip 89. This ampule 88 contains material which upon contact with the liquid 86 will produce flame, the arrangement being such that when the liquid is released from the shell 75, the member 80 under the influence of the spring 83 will travel downwardly and break the ampule 88.

A sleeve 90, secured to the upper closure 77 and extending within the bellows 76, serves to guide the member 80 and prevent lateral distortion of the bellows.

In this form of the invention, the spring 83 is compressed at the time the liquid filling 86 is supplied, as will be described shortly. In order to optionally render the igniter inoperative, an inverted U-shaped member 91 is secured to the upper closure 77, with the legs thereof 91-a extending downwardly on opposite sides of the bellows 76. The legs 91-a each have an inward extension 91-b adapted to engage a flange 75-f formed on the shell 75 below the bellows 76. The parts are so proportioned that with the leg extensions 91-b seated on the flange 75-f, the operating member 80 is maintained with its lower extremity 81-a spaced above the closure 78, regardless of temperature.

The member 91 is of resilient material so that the legs 91-a, unless restrained, will spread sufficiently to cause extensions 91-b to clear the flange 75-f, freeing the member 80 for movement to rupture the closure 78. A ring 92 is provided which encircles the legs 91-a and prevents such spreading, being releasably secured by engaging the offsets 91-c in the legs 91-a.

With the ring 92 in place, the legs 91-a are maintained in engagement with the flange 75-f, preventing operation of the igniter. If the legs are released by removal of the ring 92, they will spring apart to clear the flange, and the device is set for operation.

Since as before, the body of liquid 86 determines the temperature at which the igniter operates, the temperature and pressure conditions, which prevail while the shell 75 is filled are quite important. Thus, for filling the shell, apparatus quite similar to that of Figure 9 may be employed providing an evacuated tank with a body of liquid therein at an accurately controlled temperature, in which the shells 75 are submerged. However, a different type of loading rack is required.

Since the spring 83 is energized, when the device is assembled, means are required for positioning the member 80 so that its lower end 81-a is within the shell 75 to permit installation of the frangible closure 78, thus compressing the spring 83. Furthermore, the spring 83 must be maintained under proper compression during the operation of filling and sealing the shell 75. For this purpose, a clamp mechanism, generally indicated by the numeral 95 in Figure 17, may be employed.

Referring to Figures 17 and 18, the clamp 95 comprises a lower arm 96 provided with a slot 96-a for receiving the shell 75 which is inserted with the flange 75-e below the arm 96, and an upper arm 97 supported in adjustable spaced relation above arm 96 by a nut 98 threaded on a rod 99 secured to arm 96. The arm 97 has an aperture 97-a for accommodating the upper end of the tube 81, which extends some distance above the upper closure 77 (see Figure 17) before being sealed as shown at 82 in Figure 15.

The tube 81 is pinched slightly just below its upper end to accommodate a U-shaped washer 100 (Figure 19) which supports the member 80 on the arm 97. It will be apparent that by appropriate manipulation of the nut 98, the member 80 may be drawn upwardly within the shell 75 as required.

After the installation of the closure 78, the nut 98 is adjusted to permit the end of the member 80 to lightly contact the closure 78, and the shell 75 is supported in a vertical position in the evacuated tank with the open end of tube 81 submerged. After an appropriate interval, the tube 81 is pinched together to form the closure 82, the device is removed from the liquid 43, and the clamp 95 is removed from the device. The tube 81 is then cut and soldered at the pinched closure 82.

Before removing the clamp 95, it may be desirable to manipulate the nut 98 to withdraw the member 80 sufficiently to permit the legs 91-a of the safety member 91, to be moved into engagement with the flange 75-f and the retaining ring 92 applied.

Figures 20 and 21 show an igniter 101 having a mode of operation similar to that of the previously discussed forms and employing a molded shell 102 formed, for example of glass or plastic of suitable characteristics. The upper end of the shell 102 has an expansible closure comprising a bellows or Sylphon 103 with its upper end molded into an inturned flange 102-a formed integrally with the shell 102 and its lower end secured to the operating member 105. The lower end 106 of the member 105 is adapted to fracture the frangible closure 107, which may be conveniently formed by a portion of reduced thickness in an integral transverse wall 102-b at the lower end of shell 102. An intermediate apertured wall 102-c serves to guide the member 105 axially of the shell 102.

To prevent accidental fracture of the closure 107, a retaining member 109 is provided which threadedly engages the upper end of the operating member 105 and has a large head 110 for engaging the flange 102-a at the upper end of the shell 102. By suitable adjustment, the member 109 maintains the member 105 with its lower end 106 spaced above the closure 107.

This form of the igniter also relies on the contraction of a body of liquid 111 in the shell 102 for operation. In filling the shell 102, the retaining member 109 is adjusted to position the end 106 of the operating member 105 in contact with the closure 107. The shell 102 is then placed in an evacuated tank in an inverted position and with the filling tube 112 submerged in the liquid and upwardly directed. After a suitable interval, the shell is removed from the liquid and the tube 112 cut off and sealed as indicated at 113.

A spring 115 for operating the igniter 101 is fixed to depend from an overhanging arm 116-a of a bracket 116 secured, for example, to the filling and vent cover 117 of a smudge pot, orchard heater or the like 118, similar to that shown in Figure 1.

The cartridge 120 for cooperating with the igniter 100, comprises an ampule 121 containing suitable material for igniting the liquid 111, secured as by cementitious material 122 in a ring 123. This ring 123 has a reduced portion 123-a, adapted to enter one of the vent holes 117-a in the cover 117 and providing a shoulder 123-b which supports the cartridge in the cover. The ring 123 also has a plurality of upwardly extending legs 123-c, adapted to fit within an extension 102-d of the shell 102 and seat against the wall 102-b (see Figure 21).

In setting the igniter 101 for use, the cartridge 120 is first mounted on the cover 117, and the retaining member 109 is removed from the igniter. The igniter 101 is then manipulated to cause the spring 115 to enter the space within the bellows 103 and engage the bottom wall thereof. The igniter is then forced upwardly, compressing the spring 115 until the extension 102-d can pass over the legs 123-c, after which the igniter 101 is lowered so as to be supported on these legs, the spring 115 being of such characteristics as to be properly tensioned with the igniter in this position. A guide pin 124, secured to the arm 116-a, is provided within the spring 115 to support the spring laterally, and may be arranged for removal if desired to facilitate mounting the igniter.

The operation of this form of igniter is substantially the same as that of the previously discussed forms, that is, the spring 115, which is energized when the igniter 101 and cartridge 120 are assembled on the cover 117, urges the member 105 to fracture the frangible member 107, and is restrained by the liquid filling 111 until the temperature falls below a predetermined low. Thereafter, the member 105 fractures the member 107, releasing the liquid 111, and then fractures the ampule 121, the material therein igniting the liquid 111 upon contact therewith.

Some types of orchard heaters, smudge pots and the like are not provided with wicks such as 17 of Figure 1 for igniting the fuel, the heater 118 of Figure 21 being shown by way of example as of this type. In such cases the cartridge may be provided with a wick, as 125, for carrying the burning liquid from the igniter to the fuel 126 in the heater. This wick 125 is formed of braided asbestos twine, or other suitable material, secured at its upper end in the cementitious material 122 and of suitable length to extend into the fuel 126.

Brief consideration will show that in all the modifications of the device discussed hereinbefore, the initial step in the operation of the device in response to the temperature reaching the predetermined figure is the release of the liquid filling from the shell, the next step comprising the breaking of the ampule to allow the released liquid to contact the material therein and become ignited. These steps take place in such rapid succession as to occur almost simultaneously. Nevertheless, there are two steps, and the operation of the device can be terminated at the end of the first step by merely omitting the ampule and/or the material therein, the device then serving merely to release a body of liquid for any desired purpose, and forming a complete, operative structure for this purpose.

I claim:

1. An automatic igniter comprising a tubular shell, closures for the opposite ends of said shell, one of said closures being movable toward and away from the other closure, means whereby movement of said movable closure operates to form a discharge opening for the shell, means resiliently urging said movement, a liquid filling in said shell preventing operating movement of said movable closure at ambient temperatures above a predetermined low, and means cooperable with liquid discharged through said opening to produce a flame.

2. An automatic igniter comprising a tubular shell, closures for the opposite ends of said shell, one of said closures being movable toward and away from the other closure, a member extending between said closures for opening the other closure to form said opening in response to movement of said movable closure, means resiliently urging said movement, a liquid filling in said shell maintaining said closures so spaced at a predetermined temperature that said member contacts both closures, whereby a drop in the ambient temperature below said predetermined low causes movement of the movable closure to form said opening, and means cooperable with the liquid discharged through said opening to produce flame.

3. In an automatic igniter: means forming a pair of bodies of material adapted to ignite and produce flame upon contacting each other, at least one of said materials being a liquid; means enclosing said liquid, including a frangible wall adjacent the other material; and a member movable in response to contraction of said liquid, for fracturing said wall, releasing said liquid and causing said materials to contact.

4. In an automatic igniter: means forming a pair of bodies of material adapted to ignite and produce flame upon contacting each other, at least one of said materials being a liquid; means enclosing said liquid, including a frangible wall adjacent the other material; a member movable in response to contraction of said liquid for fracturing said wall at a predetermined temperature, to release said liquid and cause it to contact the other material; and means adjustable to cause said fracturing member to operate at different temperatures.

5. In an automatic igniter: means forming a pair of bodies of material adapted to ignite and produce flame upon contacting each other, at least one of said materials being a liquid; means enclosing said liquid, including a frangible wall adjacent the other material; a member mounted for movement to fracture said wall; means adapted to resiliently urge said member to fracturing position; means whereby said liquid prevents fracturing movement of said member at ambient temperatures above a predetermined low; and means optionally operable to prevent fracturing movement of said member or to energize the means to resiliently urge said member.

6. In an automatic igniter: means forming a pair of bodies of material adapted to ignite and produce flame upon contacting each other, at least one of said materials being a liquid; means enclosing each of said bodies, each of said enclosing means comprising a frangible wall, said walls being closely spaced; a member mounted for movement to fracture said wall; means resiliently urging said member to fracturing position to release said materials for contact; and means whereby said liquid prevents fracturing movement at ambient temperatures above a predetermined low.

7. In an automatic igniter: means forming a sealed container; a body of liquid substantially entirely filling said container, means in said container operating responsive to a change in volume of said liquid caused by a variation in temperature for releasing said liquid from said container; means for varying the volume of said container to vary the temperature response of the liquid releasing means, and means cooperable with liquid released from said container to produce a flame.

8. In an automatic igniter: means forming a sealed container, having an expansible element varying the volume thereof, and means adapted to form a discharge opening; a body of liquid substantially entirely filling said container; a member engaging said element for movement therewith and adapted, upon predetermined movement of said element, to cause the discharge forming means to release said liquid; means resiliently urging movement of said element to reduce the volume of said container, said liquid preventing movement of said element in volume decreasing direction until the temperature of said liquid falls below a predetermined temperature; and means cooperable with liquid released from said container to produce a flame.

9. In an automatic igniter: a hollow shell; means forming closures respectively for opposed openings in the shell; means mounting one of said closures for movement toward and away from the other closure; a member extending lengthwise of the shell between said closures adapted to open one of said closures to provide a discharge opening; means resiliently urging said closures toward each other; a liquid in said shell for maintaining said closures in definite spaced relation at a predetermined temperature, and responsive to a fall in temperature to release said closures to approach, whereby said member opens said one closure for discharging said liquid; means for adjusting the length of said member to vary the temperature at which said liquid prevents movement of said closures to release the liquid; and means cooperable with said liquid when released to produce flame.

10. The method of forming an automatic liquid discharge device which comprises: providing a hollow shell having a pair of openings, with means forming closures for said openings, and operating means which in response to movement of one of said closures in response to a change in volume of said shell, forms a discharge opening for the contents of the shell, which comprises; maintaining said movable closure at a definite position in the shell, providing an opening into the shell, comprising a tube extending from the shell, submerging said shell in a body of liquid at a predetermined temperature, said shell and said tube being upwardly directed, with the mouth of said tube below the surface of the liquid, and sealing said tube.

11. In an automatic liquid discharge device: an expansible tubular shell, closed at its opposite ends; a member extending lengthwise of the shell secured to one end thereof, and adapted to rupture the opposite end in response to contraction in the length of said shell; means resiliently urging said shell to contract; and a liquid filling in said shell maintaining said shell against contraction to cause rupture of said opposite end above a predetermined temperature.

12. In an automatic liquid discharge device: an expansible tubular shell, closed at its opposite ends; a member extending lengthwise of the shell secured to one end thereof, and adapted to rupture the opposite end in response to contraction in the length of said shell, at least a portion of said member being tubular and extending through said end to provide a filling opening sealed after filling; means resiliently urging said shell to contract; and a liquid filling in said shell maintaining said shell against contraction to cause rupture of said opposite end above a predetermined temperature.

13. In an automatic liquid discharge device: means enclosing a body of liquid, including a frangible wall; a member mounted for movement to fracture said wall and release said liquid; means resiliently urging said member to fracturing position; and means whereby said liquid prevents fracturing movement of said member at ambient temperatures within a range having a predetermined end point, and releasing said member for movement upon the temperature reaching said end point.

14. An automatic liquid discharge device comprising a tubular shell, closures for the opposite ends of said shell, one of said closures being movable toward and away from the other closure, means whereby movement of said movable closure operates to form a discharge opening for the shell, means resiliently urging said movement, a liquid filling in said shell preventing operating movement of said movable closure at ambient temperatures within a range having a predetermined end point, and releasing said closure for movement upon the temperature reaching said end point, and means adjusting the effective volume of said shell.

15. The method of forming an automatic liquid discharge device which includes a hollow shell having a pair of openings, means forming closures for said openings, and means which upon movement of one of said closures in response to a change in volume of said shell, forms a discharge opening for the contents of the shell, which comprises; maintaining said movable closure at a definite position in the shell, providing an opening into the shell, filling said shell with liquid at a predetermined temperature, and sealing said opening while immersed in liquid.

16. The method of forming an automatic liquid discharge device which includes a hollow shell for enclosing the liquid, and means operating in response to a change of volume of liquid in said shell as effected when the temperature of the liquid varies from a predetermined temperature, to form a discharge opening for the contents of the shell, which method comprises; providing an opening into the shell, filling the shell by submerging it in a liquid at a predetermined temperature approximating that at which said discharge opening will be formed, and sealing said opening while it is submerged.

17. The method of forming an automatic liquid discharge device which includes a hollow shell for enclosing the liquid, a force applying means, and means which is operated by said force applying means only in response to a temperature effected change in volume of liquid in said shell, to form a discharge opening through a portion of the shell, which method comprises; providing an opening into the shell, filling the shell by submerging it in a liquid at a temperature approximating the temperature at which the discharge opening will be formed, and sealing said opening while said force applying means is inoperative and while maintaining the shell submerged and said discharge opening forming means in contact with the portion of the shell in which the discharge opening is to be formed.

18. The method of forming an automatic liquid discharge device which includes a hollow shell having a pair of openings, a movable closure and a frangible closure for said openings, spring loaded means operating upon movement of said movable closure in response to a temperature effected change in volume of said liquid, to rupture said frangible closure and form a discharge opening for the contents of the shell, which comprises; providing an opening into the shell, removing the spring load from said rupturing means, filling the shell by submerging it in a liquid approximating the temperature at which said rupturing means will be operative to restore the frangible closure, securing said frangible closure to the shell to seal said opening while the opening is submerged and said frangible closure in contact with said rupturing means.

CYRIL CHARLES CROCKETT.

References Cited in the file of this patent

UNITED STATES PATENTS

| Number | Name | Date |
|---|---|---|
| 1,083,749 | Lighthipe | Jan. 6, 1914 |
| 1,328,788 | Bray | Jan. 20, 1920 |
| 2,052,925 | Fernandez | Sept. 1, 1936 |
| 2,202,705 | Martin-Hurst et al. | May 28, 1940 |
| 2,480,397 | Crockett | Aug. 30, 1949 |